United States Patent Office 3,234,238
Patented Feb. 8, 1966

3,234,238
SUBSTITUTED TETRAHYDROTHIOPHENES
AND THEIR PREPARATION
Edward D. Weil, Lewiston, and Sheldon B. Greenbaum, Tonawanda, N.Y., assignors to Hooker Chemical Corporation, Niagara Falls, N.Y., a corporation of New York
No Drawing. Filed Nov. 2, 1961, Ser. No. 149,534
32 Claims. (Cl. 260—329)

This invention relates to disubstituted tetrahydrothiophenes and methods for their synthesis.

More particularly, this invention describes the preparation and some of the uses of certain 3-substituted-4-substituted tetrahydrothiophenes whose structure is:

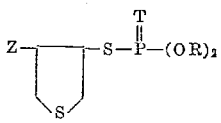

wherein Z is a radical selected from the group consisting of halogen, alkoxy, alkylmercapto, benzylmercapto, halogenated benzyl mercapto, sulfhydrylalkylmercapto, hydroxyalkylmercapto, aryloxy, arylmercapto, nitroaryloxy, nitroarylmercapto, halogenated, aryloxy, halogenated arylmercapto, and where R is alkyl, preferably methyl or ethyl and T is selected from the group consisting of sulfur and oxygen.

The novel compositions of this invention are valuable as pesticides, pesticide intermediates and chemical intermediates generally.

Examples of the Z substituent include among many others the following substituents: chlorine, bromide, methoxy, ethoxy, propoxy, butoxy, octyloxy, methylmercapto, ethylmercaptor, propylmercapto, butylmercapto, amylmercapto, octylmercapto, dodecylmercapto, benzylmercapto, p-chlorobenzylmercapto, phenoxy, naphthoxy, phenylmercapto, p-nitrophenoxy; p-nitrophenylmercapto, p-chlorophenoxy, p-chlorophenylmercapto, dichlorophenoxy, dichlorophenylmercapto, 2,4,5-trichlorophenoxy, 2,4,5-trichlorophenylmercapto, 2-mercaptoethylmercapto, 2-hydroxyethylmercapto, and homologs of the above groups. The preferred value of R is methyl or ethyl, although R may also be isopropyl, propyl, butyl, or homologs thereof; where R is methyl or ethyl, the highest biological activity is observed.

While all of the above-exemplified compositions are valuable as pesticides, pesticide intermediates, or chemical intermediates generally, as in any large group having diverse utilities, certain compositions will be more valuble than others for certain purposes. Here, the compositions wherein Z is alkylmercapto, halogen, arylmercapto and halogenated arylmercapto are preferred for pesticide use for reasons of ease and low cost of preparation and availability of starting materials, and high activity. Within this narrower group of compositions preferred for their pesticidal properties is yet a narrower group of compositions especially efficacious as insecticides. These compositions which for insecticidal use, may be considered to be the preferred embodiment of this invention are selected from the group consisting of lower alkylmercapto and halogenated benzylmercaptans.

In its composition aspect the compounds of this invention offer several advantages over related compositions of the prior art. For example, the compositions of this invention are exceedingly potent insecticides both contact and systemic even at very low levels of concentration. In addition, these compositions have high and rapid knockdown capacity, long term persistence and relatively low mammalian toxicity.

The terms insect and insecticide as used here and throughout this application not only include the classical definition of small invertebrate animals having three clearly defined body regions, head, thorax and abdomen, with only three pair of legs, and usually with wings, such as beetles, ants, bees, flies, and the like, but also encompasses other allied classes of anthropods or pests whose members are wingless and usually have more than six legs, for example, spiders, ticks, centipedes, wood lice, nematodes and the like. Thus, as used here, the terms "insect" and "insecticide" are intended to conform to the definitions provided by Section 2, sub-section h of the Federal Insecticide, Fungicide and Rodenticide Act of 1947 (Public Law 104).

While the unusual combination of high toxicity toward insects at low dosage levels, long persistence and broad spectrum of activity toward a wide variety of insects are the salient advantages of the inventive compositions, the compositions do possess other important and valuble attributes. For example, they may be combined with other pesticides, for example insecticides such as DDT, methoxychlor, lindane, aldrin, endrin, DDD, BHC, parathion, malathion, methylparathion, lead arsenate, calcium arsenate, rotenone, allethrin, pyrethrum, nicotine, summer oils, dormant oils, dinitroalkylphenols, dinitrocresols, chlordane, heptachlor, chlorinated terpenes, demeton, insecticidal organophosphates, thiophosphates and dithiophosphates such as Guthion, Diazinon, Dibrom and others. The insecticides of the invention may be combined with synergists, "knockdown agents," and the like. Combination of the new insecticidal compositions with insecticides lacking a broad spectrum of insecticidal activity is especially advantageous. For example, in view of the strong miticidal properties of the new composition, they may be combined with insecticides weak in this respect such as DDT, Sevin, etc. Similarly, these compositions having fungicidal, nematocidal and germicidal activity may be combined with commercial insecticides deficient in this respect. In spite of this fungicidal activity, combination of the novel compositions with a good fungicide may often be advantageous especially since fungus or bacterial infections are more likely to attack plants, ornamentals and trees already injured by insects. Thus combinations of the novel compositions of this invention with 5-amino or 5-nitro-2,3,6-trihalophenylacetic acid may be efficacious toward plant growth diseases such as Dutch elm disease, where fungi and insects together contribute to the demise of the plant.

The insecticidal composition of this invention is further advantageous in that it may be applied in a variety of forms or by any number of methods known to the art, for example as a dust or as a liquid composition either dissolved, dispersed or emulsified. Suitable solvents include aromatic hydrocarbons such as xylene, methylnaphthalenes, trimethylbenzenes, ketones such as isophorone, chlorocarbons such as chlorobenzene and other organic solvents. Whether dissolved or dispersed in a solvent or formulated as wettable powder, the insecticides of this invention may contain as a conditioning agent one or more modifiers, conditioning agents, wetting agents, dispersing agents, emulsifying agents, surface active agents, the term adjuvants being used herein to generically represent substances which facilitate formulation, handling and application of the insecticide. In addition, said adjuvants frequently enhance insecticidal effectiveness. A satisfactory but not exhaustive list of these substances appears among other places in "Soap and Chemical Specialties," vol. 31, No. 7, pages 50 to 61; No. 8, pages 48 to 61; No. 9, pages 52 to 67 and No. 10, pages 38 to 67 (1955). Also see Bulletin E–607 of the Bureau of Entomology and Plant Quarantine of the United States Department of Agriculture.

Where convenient or desired, the novel insecticides of this invention may be made up as a solid formulation, with or without adjuvants to be applied as a dust, wettable powder, pellet or granule. Suitable solid carriers which may be used to dilute, admix or modify the physical characteristics of the insecticide include generally any inert solid material. Illustrative examples of these solid carriers include but are not limited to talcs, clays, flours, silica, alkaline earth carbonates, oxides, phosphates, sulfur and the like.

Finally, the novel insecticide may be readily formulated for use as high or low pressure propellant spray. Frequently, for household, industrial or agricultural use, especially in closed areas, aerosol type sprays are desirable and effective. Typical propellants are those which are inert and compatible with the insecticide, are generally non-flammable (although this is not a condition of operability), and may conveniently be packed in a suitable container. Suitable propellants include but are not limited to the Freons such as dichlorodifluoromethane and mixed polyhalogen substituted lower alkanes generally. Petroleum fractions or distillates are satisfactory carriers comprising ordinarily from forty to ninety-five percent by weight of the pressure spray formulations.

Another important advantage of this insecticide is that it is toxic both through systemic and contact application offering two separate means of controlling the insects.

Other advantages are low cost and simplicity of production, non-corrosiveness, and stability as well as long term duration for periods of up to several months.

In its process aspects this invention describes the preparation of the inventive compositions, where T equals oxygen, through the condensation of an O,O-dialkyl (preferably dilower alkyl) S-(4-halotetrahydro-3-thienyl) phosphorothioate with a mercaptide or alcoholate (preferably an alkali metal mercaptide or alcoholate) of the structure Z–M, wherein R and Z are as defined supra and M is a metal selected from the group consisting of alkali and alkaline earth metals, (preferably alkali metals such as sodium and potassium), and the non-metallic ammonium and alkyl-ammonium ions. The O,O-dialkyl (preferably dilower alkyl)-S-(4-halotetrahydro-3-thienyl) phosphorothioate starting material is prepared by condensing a dialkoxy (preferably a dilower alkoxy) phosphinyl sulfenyl halide with a 2,5-dihydrothiophene. The following equations show the reaction sequence:

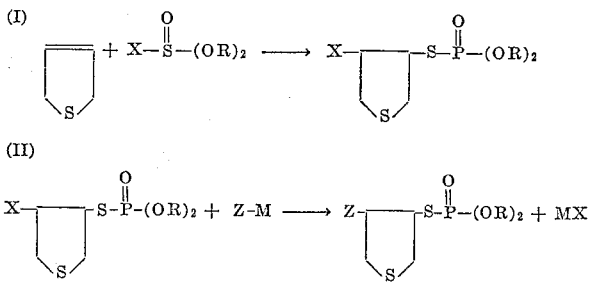

wherein R, Z and M are as described before.

The inventive process is distinguished by the complete flexibility and non-criticality of process conditions. That is, for example, after the formation of the O,O-dialkyl (preferably diloweralkyl) S-(4-halotetrahydro-3-thienyl) phosphorothioate starting material, the reaction may be carried out by adding either reactant to the other reactant dissolved in an unreactive solvent. By unreactive solvent is meant, a solvent which does not take part in the reaction and may be recovered from the reaction mixture by any recovery or isolation procedure such as distillation, decantation and the like. Examples of suitable unreactive solvents include but are not limited to alkanes, aliphatic alcohols, ketones, esters, aromatic hydrocarbons and chlorinated aromatic hydrocarbons having the desired solubility characteristics.

The temperature conditions employed in carrying out the reactions of this invention are not critical. While superior yields are obtained when the reaction is carried out near the temperature of the ice-bath, high or lower temperatures may be employed. Normally, the reactions are effected at atmospheric pressure but similar results may be obtained by working in a closed system or at sub-atmospheric pressures. The products are recovered from their reaction mixtures and purified by conventional techniques, such as extraction, evaporation, decantation, and/or crystallization depending upon the physical state of the products and the equipment available.

Where T equals sulfur and Z equals halogen, alkylmercapto, arylmercapto, substituted arylmercapto an analogous process may be used in which a compound ZX is reacted with the 2,5-dihydrothiophene, to give an adduct:

which is then reacted with (RO)$_2$PSSM to yield the desired product. Where T equals sulfur and Z equals alkoxy, aryloxy, or substituted aryloxy, a halogen X$_2$ is reacted with 2,5-dihydrothiophene, and the intermediate dihalide then reacted successively with Z—M and (RO)$_2$PSSM or with (RO)$_2$PSSM and then Z—M.

The invention is further illustrated by the following examples:

EXAMPLE 1.—PREPARATION OF O,O-DIETHYL S-(4-CHLOROTETRAHYDRO - 3 - THIENYL) PHOSPHOROTHIOATE

A solution of 14.2 grams of 2,5-dihydrothiophene in twenty milliliters of carbon tetrachloride is treated dropwise with 20.5 grams of diethoxyphosphinyl sulfenyl chloride prepared by the method of Michalski et al., Chemistry and Industry, 1199 (1958). The reaction mixture is maintained at twenty degrees centigrade and allowed to stand overnight. Treatment of an aliquot portion of the reaction mixture with potassium iodide caused the release of no iodine which showed that the sulfenyl chloride had been substantially consumed and the reaction completed. The solvent is then stripped off under reduced pressure, yielding 21.8 grams of O,O-diethyl S-(4-chlorotetrahydro-3-thienyl) phosphorothioate, a yellowish oil unstable to distillation.

Analysis.—Calcd. for C$_8$H$_{16}$ClO$_3$PS$_2$: Cl, 12.2 percent. Found: Cl, 12.5 percent.

EXAMPLE 2.—PREPARATION OF O,O-DIETHYL S-(4 - METHYLMERCAPTOTETRAHYDRO - 3 - THIENYL) PHOSPHOROTHIOATE

To a solution of 11.6 grams of O,O-diethyl S-(4-chlorotetrahydro-3-thienyl) phosphorothioate in fifty milliliters of methanol kept at zero to five degrees centigrade, is added with stirring a solution of 2.8 grams of sodium methyl mercaptide in fifty milliliters of methanol. After three hours the cooling bath is removed but the stirring is continued overnight. The precipitated sodium chloride is removed and discarded from the reaction mixture and the solvent stripped off under reduced pressure. The residue is taken up in benzene, washed with water, dried over anhydrous magnesium sulfate and stripped of solvent under vacuum to yield 6.7 grams of pure O,O-diethyl S-(4-methylmercaptotetrahydro-3-thienyl) phosphorothioate as a yellow oil.

Analysis.—Calcd. for C$_9$H$_{19}$O$_3$PS$_3$: P, 10.3 percent; S, 31.8 percent. Found: P, 9.9 percent; S, 32.0 percent.

EXAMPLE 3.—PREPARATION OF O,O-DIETHYL S-(4 - ETHYLMERCAPTOTETRAHYDRO - 3 - THIENYL) PHOSPHOROTHIOATE

To a solution of 5.82 grams of O,O-diethyl S-(4-chlorotetrahydro-3-thienyl) phosphorothioate in twenty-five milliliters of absolute ethanol kept at zero to five degrees centigrade, is added with stirring 1.68 grams of sodium ethyl mercaptide in twenty-five milliliters of absolute ethanol. After eight hours the precipitated sodium chloride is separated and the filtrate freed of solvent at reduced pressure. A 3.5 gram portion of O,O-diethyl S-(4-ethylmercaptotetrahydro-3-thienyl) phosphorothioate as a yellow oil is obtained. The product is pure enough for insecticidal use. A portion may be distilled for analytical purposes using a molecular still. It distills at one hundred and eighteen to one hundred and twenty degrees at 0.05 mm.

*Analysis.*—Calcd. for $C_{10}H_{21}O_3PS_3$: P, 9.8 percent; S, 30.3 percent. Found: P, 10.0 percent; S, 30.0 percent.

The general method of Examples 2 and 3 is applied to the preparation of additional O,O-diloweralkyl S-(4-mercaptotetrahydro-3-thienyl) phosphorothioates. For example, 9.7 grams of O,O-diethyl S-(4-chlorotetrahydro-3-thienyl) phosphorothioate is dissolved in fifty milliliters of anhydrous ethanol and treated dropwise at room temperature with a mixture of 0.033 mole of the reactant mercaptan (given in the examples below) and fifty milliliters of a sodium ethylate solution containing 15.6 grams of sodium ethylate per liter of solution. After twenty hours at room temperature, the pH of the reaction mixtures is seven. The products prepared by this method are very high boiling oils whose structures were confirmed by infrared analysis.

| Ex. No. | Reactant | Product |
|---|---|---|
| 4 | Propyl mercaptan | O,O-diethyl S-(4-propylmercaptotetrahydro-3-thienyl) phosphorothioate. |
| 5 | Butyl mercaptan | O,O-diethyl S-(4-butylmercaptotetrahydro-3-thienyl) phosphorothioate. |
| 6 | Octyl mercaptan | O,O-diethyl S-(4-octylmercaptotetrahydro-3-thienyl) phosphorothioate. |
| 7 | Ethane dithiol | O,O-diethyl S-(4-(2-sulfhydrylethyl)-mercaptotetrahydro-3-thienyl) phosphorothioate. |
| 8 | Thiophenol | O,O-diethyl S-(4-phenylmercaptotetrahydro-3-thienyl) phosphorothioate. |
| 9 | p-Chlorothiophenol | O,O-diethyl S-(4-(p-chlorophenyl)-mercaptotetrahydro-3-thienyl) phosphorothioate. |
| 10 | p-Chlorobenzyl mercaptan. | O,O-diethyl S-(4-(p-chlorobenzyl)-mercaptotetrahydro-3-thienyl) phosphorothioate. |

The compositions of this invention may be modified by the substitution of an oxygen atom for the sulfur atom in the 4-position substituent. Such ether compositions are made by the reaction of an alcohol and an O,O-diloweralkyl S-(4-chlorotetrahydro-3-thienyl) phosphorothioate in the presence of a base, i.e., in a manner analogous to the preparation of the mercapto, or thioether, compositions described above, as in the following example:

EXAMPLE 11.—PREPARATION OF O,O-DIETHYL S-(4-(4 - NITROPHENOXY)TETRAHYDRO-3-THIENYL) PHOSPHOROTHIOATE

A 9.7 gram portion of O,O-diethyl S-(4-chlorotetrahydro-3-thienyl) phosphorothioate is dissolved in fifty milliliters of anhydrous ethanol and treated dropwise at room temperature with a mixture of 0.033 mole p-nitrophenol and fifty milliliters of a sodium ethylate solution containing 15.6 grams of sodium ethylate per liter of solution. After twenty hours at room temperature, the pH of the reaction mixture is found to be seven. The product, O,O-diethyl S-(4-(4-nitrophenoxy)tetrahydro-3-thienyl) phosphorothioate, is a high boiling oil, whose structure was confirmed by infrared analysis.

*Analysis.*—Calcd. for $C_{14}H_{20}O_6NPS_2$: N, 3.6 percent. Found: N, 4.0 percent.

EXAMPLES 12.—PREPARATION OF 3 - CHLORO-4(4 - NITROPHENYLMERCAPTO) - TETRAHYDROTHIOPHENE

(a) p-Nitrophenylsulfenyl chloride 0.1 mole of bis(p-nitrophenyl)disulfide is stirred with two hundred and forty milliliters of dry chloroform and treated with gaseous chlorine (dried over sulfuric acid) until complete solution of the disulfide occurs. The solution is assayed by its ability to oxidize potassium iodide to free iodine.

(b) Addition of (a) to 2,5-dihydrothiophene

A mixture of 0.1 mole of dihydrothiophene and one hundred milliliters of dry chloroform is treated in (a). The mixture is then treated under reflux overnight and allowed to cool. The product is removed by evaporation of the solvent and recrystallized from acetone and water; melting point one hundred and thirty-five to one hundred and thirty-eight degrees centigrade.

*Analysis.*—Calcd. for $C_{10}H_8ClNo_2S_2$: N, 5.1 percent; S, 23.4 percent. Found: N, 4.8 percent; S, 22.0 percent.

EXAMPLE 13(a).—PREPARATION OF O,O-DIETHYL((4 - NITROPHENYLMERCAPTO)TETRAHYDRO-3-THIENYL) PHOSPHOROTHIOATE

A mixture of 1.4 parts of 3-chloro-4-(4-nitrophenyl mercapto) tetrahydrothiophene and sixty parts of dioxane were stirred and heated with one part of sodium diethyl phosphorothioate. After an eight hour reflux period, the reaction mixture was cooled and freed of salt. Removal of the solvent under reduced pressure gives an undistilable oil which was taken up in benzene, washed thoroughly with water and freed of solvent again under good vacuum at fifty degrees.

*Analysis.*—Calcd. for $C_{14}H_{20}O_5NPS_3$: N, 3.3 percent. Found: N, 3.4 percent.

EXAMPLE 13(b).—PREPARATION OF O,O - DIETHYL((4 - NITROPHENYLMERCAPTO)TETRAHYDRO-3-THIENYL) PHOSPHORODITHIOATE

The reaction was run as in (a) substituting the sodium salt of diethyl phosphorodithioate for the monothioate.

*Analysis.*—Calcd. for $C_{14}H_{20}O_4NPS_4$: S, 27.5 percent. Found: S, 27.7 percent.

EXAMPLE 14.—FORMULATION OF AN EMULSION

Components: Parts by weight
O,O-diethyl S-(4-chlorotetrahydro - 3 - thienyl) phosphorothioate _____ 2
Surface active agent (Triton X–100) _____ 1
Xylene _____ 1

The ingredients are blended to make a solution emulsifiable with water.

EXAMPLE 15.—ANOTHER EMULSION FORMULATION

Components: Parts by weight
O,O-diethyl S-(4 - methylmercaptotetrahydro-3-thienyl) phosphorothioate _____ 40
Surface active agent (Atlox 3335) _____ 3
Surface active agent (Atlox 8910) _____ 1
Xylene _____ 135

The ingredients are blended to make a solution emulsifiable with water.

EXAMPLE 16.—FORMULATION OF A GRANULE COMPOSITION

Components: Parts by weight
O,O-diethyl S-(4-ethylmercaptotetrahydro - 3-thienyl) phosphorothioate _____ 2
Clay (30/60 mesh) _____ 17
Urea _____ 1

EXAMPLE 17.—FORMULATION OF A CARBON BASED DUST

| Component: | Parts by weight |
|---|---|
| Activated carbon | 90 |
| O,O-diethyl S-(4-propylmercaptotetrahydro-3-thienyl) phosphorothioate | 10 |

This formulation adheres to seeds and may be used as an insecticidal seed dressing.

The following is a summary of the test procedure used to evaluate the efficacy of the compositions as insecticides.

SYSTEMIC INSECTICIDAL TESTS

Twenty milliliters of 0.01 percent concentration of the sample chemical is applied to the vermiculite substratum of potted plants. Forty-eight hours after application the plants are infested with ten adult inserts, and mortality determination is made after five days.

CONTACT INSECTICIDAL TESTS

Fifty adult houseflies of the Chemical Specialties Manufacturers Association strain are sprayed in a two by five inch diameter steel cage faced on top and bottom with fourteen mesh screen. Flies are retained in the cage in which they are sprayed for knockdown observations and twenty-four hour mortality determinations.

MEXICAN BEAN BEETLE

Lima bean leaves sprayed on the dorsal and ventral surfaces are offered to ten larvae of the southern armyworm (late third instar) and the Mexican bean beetle (late second instar) for a forty-eight hour feeding period. The feeding rate and mortality data are recorded as well as foliage injury, if any.

PEA APHID

Adult pea aphids are sprayed and transferred to sprayed pea plants and held for forty-eight hour mortality determinations. Foliage injury, if any, is recorded.

SPIDER MITE

Lima bean plants are infested with fifty to one hundred adults of the strawberry spider mite, *Tetranychus atlanticus*, prior to testing. The infested plants are dipped into the test material, removed and held for five days. Adult mortality as well as ovicidal action is noted.

EXAMPLE 18.—SYSTEMIC INSECTICIDAL EVALUATION OF REPRESENTATIVE COMPOSITIONS OF THIS INVENTION

| Compound Tested | | | Test Insect, Concentration and Percent Kill | | | |
|---|---|---|---|---|---|---|
| | | | *Macrosiphum pisi* (Pea Aphid) | | *Tetranychus atlanticus* (Strawberry Spider Mite) | |
| Z= | R= | T= | At 0.05% | At 0.005% | At 0.05% | At 0.005% |
| Chloro | $C_2H_5$ | O | 100 | 100 | 100 | 100 |
| Methylmercapto | $C_2H_5$ | O | 100 | 100 | 100 | 20 |
| Ethylmercapto | $C_2H_5$ | O | 100 | 100 | 100 | 100 |
| Ethylmercapto | $CH_3$ | O | 100 | 100 | 100 | 100 |
| Methylmercapto | $C_2H_5$ | S | 100 | 80 | 100 | 100 |
| Ethylmercapto | $C_2H_5$ | S | 100 | 100 | 100 | 90 |
| Methylmercapto | $CH_3$ | S | 100 | 80 | 100 | 100 |
| Chloro | $CH_3$ | O | 100 | 100 | 100 | 90 |
| Ethylmercapto | $CH_3$ | S | 100 | 100 | 100 | 100 |
| Methylmercapto | $CH_3$ | O | 100 | 80 | 100 | 100 |

EXAMPLE 19.—FURTHER INSECTICIDAL EVALUATION OF REPRESENTATIVE COMPOSITIONS OF THIS INVENTION PERCENT KILL, CONTACT TEST

| Compound Tested | | | *Epilachna varivestis* (Mexican Bean Beetle) | *Macrosiphum pisi* | *Tetranychus atlanticus* |
|---|---|---|---|---|---|
| Z= | R= | T= | At 0.1% | At 0.1% | At 0.1% |
| Chloro | $C_2H_5$ | O | 100 | 100 | 100 |
| Methylmercapto | $C_2H_5$ | O | | 100 | 100 |
| Ethylmercapto | $C_2H_5$ | O | 100 | 100 | 100 |
| Ethylmercapto | $CH_3$ | O | 100 | 100 | 100 |
| Propylmercapto | $C_2H_5$ | O | | 100 | 70 |
| Butylmercapto | $C_2H_5$ | O | 100 | 100 | 90 |
| Octylmercapto | $C_2H_5$ | O | | 100 | 100 |
| 2-sulfhydrylethylmercapto | $C_2H_5$ | O | | 100 | 100 |
| Phenylmercapto | $C_2H_5$ | O | 100 | 100 | 100 |
| p-Chlorophenylmercapto | $C_2H_5$ | O | 100 | 100 | 100 |
| p-Chlorobenzylmercapto | $C_2H_5$ | O | | 100 | 100 |
| p-Chlorophenylmercapto | $CH_3$ | O | 100 | 100 | 100 |
| Propylmercapto | $CH_3$ | O | | 100 | 60 |
| Butylmercapto | $CH_3$ | O | 100 | 100 | 60 |
| Octylmercapto | $CH_3$ | O | | 100 | 100 |
| 2-sulfhydrylethylmercapto | $CN_3$ | O | | 100 | 100 |
| p-Chlorobenzylmercapto | $CH_3$ | O | | 100 | 100 |

EXAMPLE 20

An 0.1 percent concentration of O,O-diethyl S-((4-nitrophenoxy)tetrahydro-3-thienyl) phosphorothioate gave a one hundred percent kill against the following in the tests described above:

CONTACT TEST

Housefly (*Musca domestica*)
Mexican bean bettle (*Epilachna varivestis*)
Pea aphid (*Macrosiphum pisi*)
Strawberry spider mite (*Tetranychus atlanticus*)

SYSTEMIC TEST

Pea aphid (*Macrosiphum pisi*)
Strawberry spider mite (*Tetranychus atlanticus*)

Except as set forth in the claims which follow, none of the examples above are to be construed as limitations of the inventive concepts or practices.

We claim:

1. A 3,4-disubstituted tetrahydrothiophene of the formula

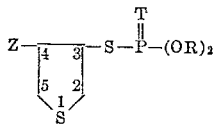

wherein Z is selected from the group consisting of bromine, chlorine, alkoxy of up to 12 carbon atoms, alkylmercapto of up to 12 carbon atoms, sulfhydrylalkylmercapto wherein the alkyl group is of up to 12 carbon atoms, hydroxyalkylmercapto wherein the alkyl group is of up to 12 carbon atoms, hydrocarbon aryloxy of 6 to 10 carbon atoms, hydrocarbon arylmercapto of 6 to 10 carbon atoms, mononitrophenoxy, mononitronaphthoxy, mononitrophenylmercapto, mononitronaphthylmercapto, brominated hydrocarbon aryloxy of 6 to 10 carbon atoms, hydrocarbon aryloxy of 6 to 10 carbon atoms, brominated hydrocarbon arylmercapto of 6 to 10 carbon atoms, and chlorinated hydrocarbon alkylmercapto of 6 to 10 carbon atoms, R is lower alkyl, and T is selected from the group consisting of sulfur and oxygen.

2. The composition of claim 1 wherein Z is alkylmercapto of up to 12 carbon atoms, R is lower alkyl, and T is oxygen.

3. The composition of claim 1 wherein Z is alkoxy of up to 12 carbon atoms, R is lower alkyl and T is oxygen.

4. The composition of claim 1 wherein Z is nitroaryloxy, R is lower alkyl and T is oxygen.

5. The composition of claim 1 wherein Z is chloro, R is lower alkyl and T is oxygen.

6. The composition of claim 1 wherein Z is arylmercapto, R is lower alkyl and T is oxygen.

7. The composition of claim 1 wherein Z is aryloxy, R is lower alkyl and T is oxygen.

8. O,O-diethyl S-(4-chlorotetrahydro-3-thienyl) phosphorothioate.

9. O,O-diethyl S-(4-methylmercaptotetrahydro-3-thienyl) phosphorothioate.

10. O,O-diethyl S-(4-(4-nitrophenoxy)tetrahydro-3-thienyl) phosphorothioate.

11. O,O-diethyl S-(4-ethylmercaptotetrahydro-3-thienyl) phosphorothioate.

12. 3-chloro-4-(4-nitrophenylmercapto) tetrahydrothiophene.

13. O,O-diethyl S-(4-propylmercaptotetrahydro-3-thienyl) phosphorothioate.

14. O,O-diethyl S-(4-butylmercaptotethahydro-3-thienyl) phosphorothioate.

15. O,O,-diethyl S-(4-octylmercaptotethahydro-3-thienyl) phosphorothioate.

16. O,O-diethyl S-(4-(2-sulfhydrylethyl)-mercaptotetrahydro-3-thienyl) phosphorothioate.

17. O,O-diethyl S-(4-phenylmercaptotetrahydro-3-thienyl) phosphorothioate.

18. O,O-diethyl S-(4-(p-chlorophenyl)-mercapto-tetrahydro-3-thienyl) phosphorothioate.

19. O,O-diethyl S-(4-(p-chlorobenzyl)-mercaptotetrahydro-3-thienyl) phosphorothioate.

20. O,O-dimethyl S-(4-chlorotetrahydro-3-trienyl) phosphorothioate.

21. O,O-dimethyl S-(4-methylmercaptotetrahydro-3-thienyl) phosphorothioate.

22. O,O-dimethyl S-(4-(4-nitrophenoxy)tetrahydro-3-thienyl) phosphorothioate.

23. O,O-dimethyl S-(4-ethylmercaptotetrahydro-3-thienyl) phosphorothioate.

24. O,O-dimethyl S-(4-propylmercaptotetrahydro-3-thienyl) phosphorothioate.

25. O,O-dimethyl S-(4-butylmercaptotetrahydro-3-thienyl) phosphorothioate.

26. O,O-dimethyl S-(4-octylmercaptotetrahydro-3-thienyl) phosphorothioate.

27. O,O-dimethyl S-(4-(2-sulfhydrylethyl)-mercaptotetrahydro-3-thienyl) phosphorothioate.

28. O,O-dimethyl S-(4-phenylmercaptotetrahydro-3-thienyl) phosphorothioate.

29. O,O-dimethyl S-(4-(p-chlorophenyl)-mercaptotetrahydro-3-thienyl) phosphorothioate.

30. O,O-dimethyl S-(4-(p-chlorobenzyl)-mercaptotetrahydro-3-thienyl) phosphorothioate.

31. A process of preparing 3-substituted-4-substituted tetrahydrothiophenes of the formula

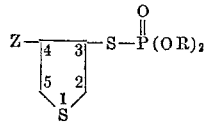

wherein Z is selected from the group consisting of alkoxy of up to 12 carbon atoms, alkylmercapto of up to 12 carbon atoms, sulfhydrylalkylmercapto wherein the alkyl group is of up to 12 carbon atoms, hydroxyalkylmercapto wherein the alkyl group is of up to 12 carbon atoms, hydrocarbon aryloxy of 6 to 10 carbon atoms, hydrocarbon arylmercapto of 6 to 10 carbon atoms, mononitrophenoxy, mononitronaphthoxy, mononitrophenylmercapto, mononitronaphthylmercapto, brominated hydrocarbon aryloxy of 6 to 10 carbon atoms, chlorinated hydrocarbon aryloxy of 6 to 10 carbon atoms, brominated hydrocarbon arylmercapto of 6 to 10 carbon atoms, and chlorinated hydrocarbon arylmercapto of 6 to 10 carbon atoms, and R is lower alkyl, which comprises contacting a compound of the formula $(RO)_2PO-SX$, wherein X is selected from the group consisting of bromine and chlorine, with 2,5-dihydrothiophene to form an adduct and contacting the resulting adduct with a compound of the formula ZM, wherein M is a cation, until one equivalent of MX is formed.

32. A process for preparing a substituted thiophene of the formula

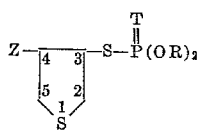

wherein Z is selected from the group consisting of bromine, chlorine, alkylmercapto of up to 12 carbon atoms, hydrocarbon arylmercapto of 6 to 10 carbon atoms, mononitrophenylmercapto, mononitronaphthylmercapto, brominated hydrocarbon arylmercapto of 6 to 10 carbon atoms, and chlorinated hydrocarbon arylmercapto of 6 to 10 carbon atoms, and T is selected from the group consisting of oxygen and sulfur, which comprises adding a compound ZX, wherein X is selected from the group consisting of bromine and chlorine to 2,5-dihydrothiophene to produce an adduct and contacting the resulting adduct with $(RO)_2P(=T)SM$, wherein R is lower alkyl and M is a cation, until one molar equivalent of MX is released.

References Cited by the Examiner

UNITED STATES PATENTS

| | | | |
|---|---|---|---|
| 2,460,233 | 1/1949 | Morris et al. | 260—332.1 |
| 2,482,088 | 9/1949 | Kharasch | 260—332.1 |
| 2,571,333 | 10/1951 | Brooks | 260—332.3 |
| 2,769,013 | 10/1956 | Lowenstein-Lom | 260—332.3 |
| 2,823,210 | 2/1958 | Johnson | 260—332.5 |
| 2,882,278 | 4/1959 | McConnell et al. | 260—332.1 |

(Other references on following page)

UNITED STATES PATENTS 2,932,651  4/1960   Ilgenfritz et al.  260—332.5
3,106,565  10/1963  Newallis           260—332.5

OTHER REFERENCES

Frear et al.: Journ. of Economic Entomology, vol. 40 (1947), pages 736–741.

Henne et al.: Journ. Amer. Chem. Soc., vol. 58 (1936), page 882.

Michalski et al.: Journ. and Ind. (1958), pages 1199–1200.

Simons: Flourine Chemistry, Academic Press, New York (1950), page 402.

WALTER A. MODANCE, *Primary Examiner.*

D. T. McCUTCHEN, NICHOLAS S. RIZZO, JOHN D. RANDOLPH, *Examiners.*